US012431165B1

United States Patent
Gubbins et al.

(10) Patent No.: US 12,431,165 B1
(45) Date of Patent: Sep. 30, 2025

(54) OPTICAL MAGNETIC RECORDING SYSTEM, WRITER, MEDIA, AND METHOD

(71) Applicant: Seagate Technology LLC, Fremont, CA (US)

(72) Inventors: Mark Anthony Gubbins, Letterkenny (IR); Alexey Dobrynin, Derry (IR); Kevin Anthony McNeill, Derry (IR)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/912,744

(22) Filed: Oct. 11, 2024

(51) Int. Cl.
| | |
|---|---|
| *G11B 11/105* | (2006.01) |
| *G11B 5/00* | (2006.01) |
| *G11B 5/02* | (2006.01) |

(52) U.S. Cl.
CPC .......... *G11B 11/10539* (2013.01); *G11B 5/02* (2013.01); *G11B 11/10506* (2013.01); *G11B 2005/0021* (2013.01); *G11B 2005/0026* (2013.01)

(58) Field of Classification Search
CPC ......... G11B 5/00; G11B 11/10; G11B 11/115; G11B 2005/0021; G11B 5/3106; G11B 5/607; G11B 5/6088; G11B 5/3133; G11B 11/10515; G11B 11/10543; G11B 5/39
USPC .......................................................... 360/59
See application file for complete search history.

(56) References Cited

U.S. PATENT DOCUMENTS

| | | | |
|---|---|---|---|
| 5,329,505 A | * | 7/1994 | Ohtsuki ............ G11B 11/10506 |
| 6,865,147 B2 | | 3/2005 | Hosokawa |
| 8,164,988 B2 | | 4/2012 | Stipe |
| 9,280,996 B2 | | 3/2016 | Hellwig |
| 11,790,943 B2 | | 10/2023 | Wang |

OTHER PUBLICATIONS

Igarashi, "Optically induced ultrafast magnetization switching in ferromagnetic spin valves", *nature materials*, Mar. 9, 2023, 16 pages.
Nguyen "Distinguishing surface and bulk electromagnetism via their dynamics in an intrinsic magnetic topological insulator", *Science Advances*, Aug. 9, 2024, 10, 9 pages.
Remy, "Ultrafast magnetization reversal in ferromagnetic spin-values: an s-d model perspective", *Canvendish Laboratory*, Mar. 13, 2023.

* cited by examiner

*Primary Examiner* — Nabil Z Hindi
(74) *Attorney, Agent, or Firm* — Mueting Raasch Group

(57) ABSTRACT

Described are optical magnetic recording systems, writers, media, and methods that utilize pulses of electromagnetic radiation to deterministically record information on magnetic storage media unaided by any additionally applied magnetic field such as from a write pole. The recording pulses may be linearly (or longitudinally) polarized pulses or circularly polarized pulses. The pulses may be modulated in accordance with data bits to be written on the media. Modulation may include modulating the polarization state(s) of the pulses and/or modulating the amplitude(s) the pulses, depending on the particular construction or configuration of the magnetic storage media to be used. Described are recording systems and methods that include laser light pulse generation, light pulse modulation, light pulse delivery, and magnetic media constructions.

28 Claims, 8 Drawing Sheets

OPTICAL MAGNETIC RECORDING SYSTEM, WRITER, MEDIA, AND METHOD

TECHNICAL FIELD

The disclosure relates to optical magnetic recording.

SUMMARY

In accordance with various aspects, the present disclosure describes optical magnetic recording systems for deterministically recording data bits on magnetic storage media located proximate to a media-facing surface of a recording head. The recording head includes an optical writer configured to generate light pulses capable of deterministically recording data bits on the media without the aid of an additionally applied magnetic field. Such systems include a pulsed laser, a modulator configured to modulate light pulses produced by the pulsed laser in correspondence to data bits to be recorded on the magnetic storage media, a near field transmitter located at or near a media-facing surface, and a light guide configured to deliver the light pulses modulated by the modulator to the near field transmitter for focusing and directing recording pulses to the magnetic storage media.

In certain aspects, the recording pulses are linearly polarized or circularly polarized.

In certain aspects, such optical magnetic recording systems are configured to record data at data rates in a range of about 2 Gb per second to about 4 Gb per second. In certain aspects, the laser is configured to produce light pulses having widths of about 10 picoseconds or less.

In certain aspects, the laser is an active or passive mode-locked laser. In certain aspects, the laser is sized to be integrated within the recording head and to fit into an area of about 770 microns by 330 microns. In certain aspects, the laser is a III-V semiconductor laser.

In certain aspects, the modulator is an electro-absorption modulator or an electro-refractive modulator.

In accordance with various aspects, the present disclosure also describes methods for deterministically recording data on a magnetic storage medium using electromagnetic pulses without the aid of an additionally applied magnetic field. Such methods include generating laser light pulses, modulating the laser light pulses in accordance with data bits to be recorded on the magnetic storage medium to thereby produce high power recording pulses and low power recording pulses, using a single high power recording pulse to record a data bit on the magnetic storage medium in a first data state, and using a single high power recording pulse followed immediately by a single low power recording pulse to record a data bit on the magnetic storage medium in a second data state.

In certain aspects, the laser light pulses are linearly polarized, and modulating the laser light pulses maintains the polarization.

In certain aspects, such methods further include using a near field transducer to focus and direct the recording pulses at the magnetic storage medium.

In certain aspects, the magnetic storage medium has a layered construction that includes a FePt recording layer disposed between a first spin torque transfer layer and a second spin torque transfer layer. In certain aspects, a first spacer layer is disposed between the first spin torque transfer layer and the FePt recording layer, and a second spacer layer is disposed between the second spin torque transfer layer and the FePt recording layer.

In accordance with various aspects, the present disclosure further describes optical writers for optical magnetic recording systems. Such optical writers include a laser configured to produce linearly polarized light pulses, a waveguide configured to receive the linearly polarized light pulses from the laser, and a circular polarization switch coupled to the waveguide, the circular polarization switch including a first branch having a first modulator configured to select and deselect use of the first branch and a first mode converter for converting linearly polarized light to clockwise circularly polarized light, and a second branch having a second modulator configured to select and deselect use of the second branch and a second mode converter for converting linearly polarized light to counterclockwise circularly polarized light. The circular polarization switch is configured to convert the linearly polarized light pulses to clockwise or counterclockwise circularly polarized light pulses in accordance with data bits to be recorded by the optical magnetic recording system.

In certain aspects, the laser is an active or passive mode-locked laser. In certain aspects, the writers are configured to record data at data rates in a range of about 2 Gb per second to about 4 Gb per second. In certain aspects, the laser is configured to produce light pulses having widths of about 10 picoseconds or less. In certain aspects, the laser is sized to fit into an area of about 770 microns by 330 microns. In certain aspects, the laser is a III-V semiconductor laser.

In certain aspects, the writers further include a near field transmitter positioned to receive light converted by the circular polarization switch and configured to produce recording pulses that preserve the polarization state of the light received by the circular polarization switch.

In accordance with various aspects, the present disclosure further describes layered magnetic storage media for use with a magnetic optical recording system. Such media include a FePt recording layer for storing data bits in up and down magnetization states, a first spin torque transfer layer disposed above the FePt recording layer and configured to emit a first spin transfer current to the FePt recording layer when illuminated by a linearly polarized light pulse, a first spacer layer capable of conducting spin current and disposed between the FePt recording layer and the first spin torque transfer layer, a second spin torque transfer layer disposed below the FePt recording layer and configured to emit a second spin transfer current to the FePt recording layer when illuminated by a linearly polarized light pulse, and a second spacer layer capable of conducting spin current and disposed between the FePt recording layer and the second spin torque transfer layer, wherein the second spin transfer current is greater than the first spin transfer current.

In certain aspects, the first spin torque transfer layer and the second spin torque transfer layer are high anisotropy materials. In certain aspects, the first spin torque transfer layer and the second spin torque transfer layer are ferromagnetic, ferrimagnetic or antiferromagnetic materials. In certain aspects, the first spin torque transfer layer and the second spin torque transfer layer are FePt, SmCo, CoPt, PtMn, or IrMn.

In certain aspects, the first spacer layer and the second spacer layer are composed of materials capable of conducting spin current. In certain aspects, the first spacer layer and the second spacer layer are copper or silver.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
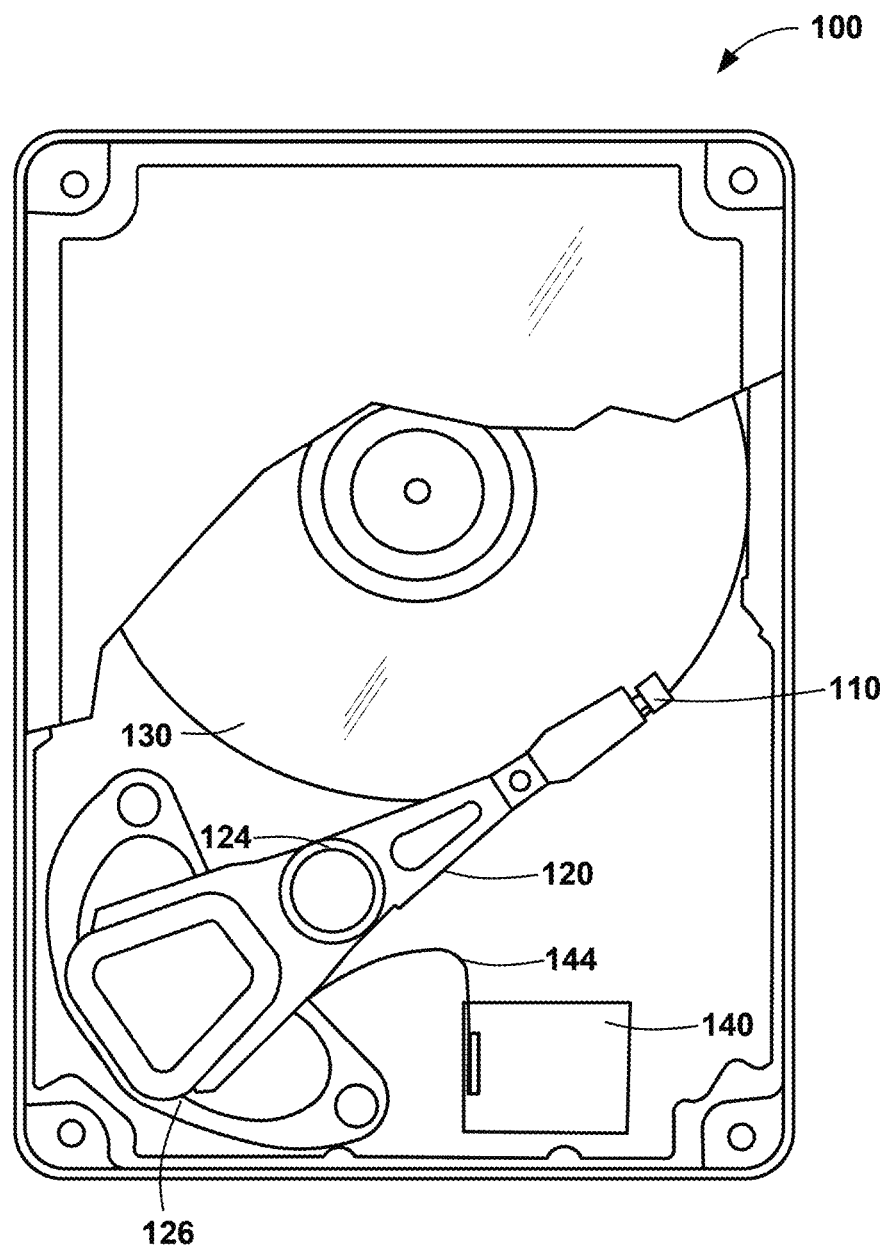
FIG. 1 is a schematic representation of certain components found in a disk drive, which may be useful in implementations according to the present disclosure.

The present disclosure relates to systems and methods for using pulses of electromagnetic radiation to deterministically record information on magnetic storage media unaided by any additionally applied magnetic field such as from a write pole. This manner of data recording, referred to herein as optical magnetic recording (OMR), may utilize a pulsed laser to generate optical pulses that are in turn modulated to deterministically write up bits and down bits in the storage media. Modulation may include modulating the polarization state such as the handedness of circularly polarized light, may include adjusting the amplitude(s) of one or more pulses of linearly polarized light, or the like. The light pulse modulation utilized may depend on the particular construction or configuration of the magnetic storage media to be used. The present disclosure provides for recording systems and methods, including light pulse modulation, light pulse delivery, and magnetic media constructions for OMR using linearly polarized or circularly polarized light.

As compared to current magnetic recording techniques used in hard disk drives (HDDs), such as heat-assisted magnetic recording (HAMR), OMR may increase storage density, referred to as areal density capability (ADC), may reduce thermal effects during writing, and may increase the speed of bit switching. In accordance with certain aspects, OMR systems and methods may utilize ultrafast optical pulses for improved ADC and system performance. Moreover, because OMR does not utilize a magnetic write pole as found in typical HDDs, the OMR recording heads may have simpler constructions and fewer components, thus reducing manufacturing complexity and cost.

While various potential advantages over HAMR HDDs may be realized in OMR systems in accordance with aspects of the present disclosure, it is also recognized that it may be beneficial to retain certain of the configurations, materials, infrastructure, and manufacturing and assembly processes that have been established for and successfully demonstrated in HAMR HDDs. As such, it may be preferable to fashion OMR systems, components, and methods in a manner that retains much of what is currently used in HAMR HDD designs and for components such as the laser, the waveguides and other light delivery components, the near field transducer (NFT), and other materials in the head, as well as materials utilized in the FePt or other magnetic storage media. For example, in accordance with various aspects, OMR may be implemented using light delivery and NFT components that are similar to what is used in current HAMR HDDs to facilitate generating light pulses that are directed at a magnetic storage media surface to thereby deterministically write magnetic bits on the media.

When designing OMR systems in accordance with the present disclosure, several factors may be taken into account. With respect to the magnetic storage media, circularly polarized light pulses may be used to switch bits in a deterministic fashion on FePt media that is the same or similar to the media used in current HAMR HDDs. Moreover, ADC and write performance may be extended using circularly polarized light and standard media. Magnetic storage media suitable for deterministic switching with linearly polarized light pulses will generally make use of media designs that include so-called spin generation layers, spin transfer layers, and spacers, as set forth in various aspects disclosed herein. With respect to the use of ultrafast lasers, the bits stored on the magnetic media are generated by modulating the power output from a semiconductor laser. Such a laser may be designed to output short optical pulses, for example less than about 10 picoseconds. With respect to the writer design, that may depend on whether the OMR system is intended to record using circularly polarized light or linearly polarized light. Linearly polarized light can be generated using the same electric field used in current HAMR HDD designs and applied to ultrafast lasers and timescales for OMR. Circularly polarized light may utilize light delivery systems that include mode converters and mixing to achieve a 50% mix of both TM (transverse magnetic) and TE (transverse electric) light needed for circular polarization conversion. This may involve using two waveguides and an optical modulator integrated into the recording head to control left and right chirality for deterministic switching with circular polarization.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements.

FIG. 1 is a schematic view of disk drive 100 including an actuation system for positioning slider 110 over tracks of magnetic media 130. Embodiments of the present disclosure may be used with various disk drive configurations, and the particular configuration of disk drive 100 shown is illustrative and not limiting. Disk drive 100 includes voice coil motor 126 arranged to rotate actuator arm 120 on a spindle axis 124. Magnetic media 130 rotates under slider 110 (also referred to herein as a recording head), which is kept aloft a small distance above the surface of magnetic media 130. Magnetic media 130 may be formatted with an array of data storage cells for storing data. In a typical HDD, recording head 110 carries magnetic transducers (not shown in FIG. 1) configured for reading and writing data onto tracks on magnetic media 130. In HAMR drives, the magnetic write transducer utilizes additional electromagnetic energy to heat the surface of media 130 to facilitate recording. As such, a HAMR transducer typically includes a magnetic writer for generating a magnetic field to write to a magnetic media, and a near field transducer (NFT) that can be activated by electromagnetic energy, such as from a laser, to generate plasmons that are directed toward the magnetic media proximate to the write field to assist in the writing process. Controller 140 is configured to provide data to and receive data from a host device through an interface (not shown). Controller 140 is coupled to the actuator arm 120 via flex cable 144 to thereby establish communications between the controller 140 and the recording head 110 along with signal conditioning circuitry such as a preamp (not shown). Controller 140 may also control the spinning of media disks 130 and the operation of voice coil motor 126. Disk drive 100 may be enclosed in a sealed housing and filled primarily with an inert gas, such as helium.

In various configurations in accordance with the present disclosure, disk drive 100 may be implemented as an OMR disk drive. In the case of OMR, the recording head 110 may include the same reader transducer(s) that appear in conventional HDDs, but the recording head 110 need not include a magnetic write pole. Instead, the writer of recording head 110 includes a pulsed laser, a light delivery system such as a waveguide, and a pulse modulation system, all of which are designed to deliver modulated and polarized light pulses to an NFT for amplification, focusing, and directing of polarized recording pulses to the magnetic media 130. The magnetic field and modulation of these recording pulses are sufficient without the use of a magnetic field from a write pole to record bits as magnetic poles in the magnetic media 130.

Figure 2A:
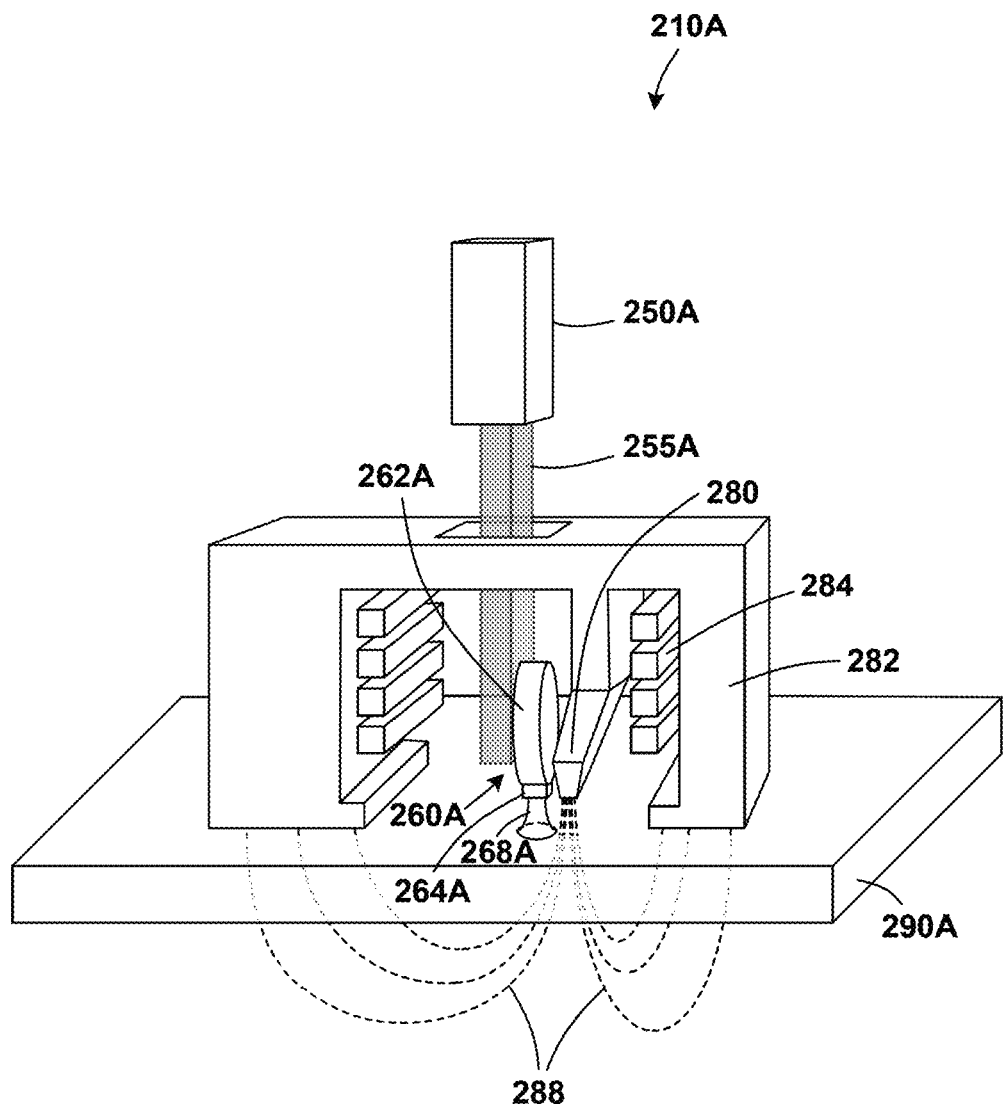
FIG. 2A is a schematic representation of certain components of a heat-assisted magnetic recording head.

FIG. 2A schematically shows certain components that may be included in a HAMR recording head 210A. As with many magnetic recording heads, a write element 282 includes a coil 284 (shown partially and in cut-away fashion) to generate a magnetic field 288 between the write element 282 and a write pole 280. These magnetic write elements are designed to produce a magnetic field 288 that is perpendicular to the surface of recording medium 290A in the area underneath the write pole 280. As storage densities increase and recorded bits sizes become smaller, the stability of the recorded bits may be aided by increasing the coercivity of the magnetic media 290A. However, it is more difficult to flip bits in higher coercivity media. As such, electromagnetic energy produced by laser light can be used to selectively heat the media, thereby lowering the coercivity of the media at and around the bit being recorded. As shown schematically in FIG. 2A, a light generator 250A such as a laser provides light that is delivered via a waveguide 255A to an NFT 260A located at or near the air bearing surface, or ABS, (also referred to herein as the media facing surface) of the recording head 210A. NFT 260A may include a plasmonic disk 262A and a peg 264A that extends from the plasmonic disk 262A toward the ABS to thereby focus and direct a plasmonic beam 268A at the surface of the media 290A. The plasmonic beam 268A locally heats the media 290A at a spot just ahead of the write pole 280.

Figure 2B:
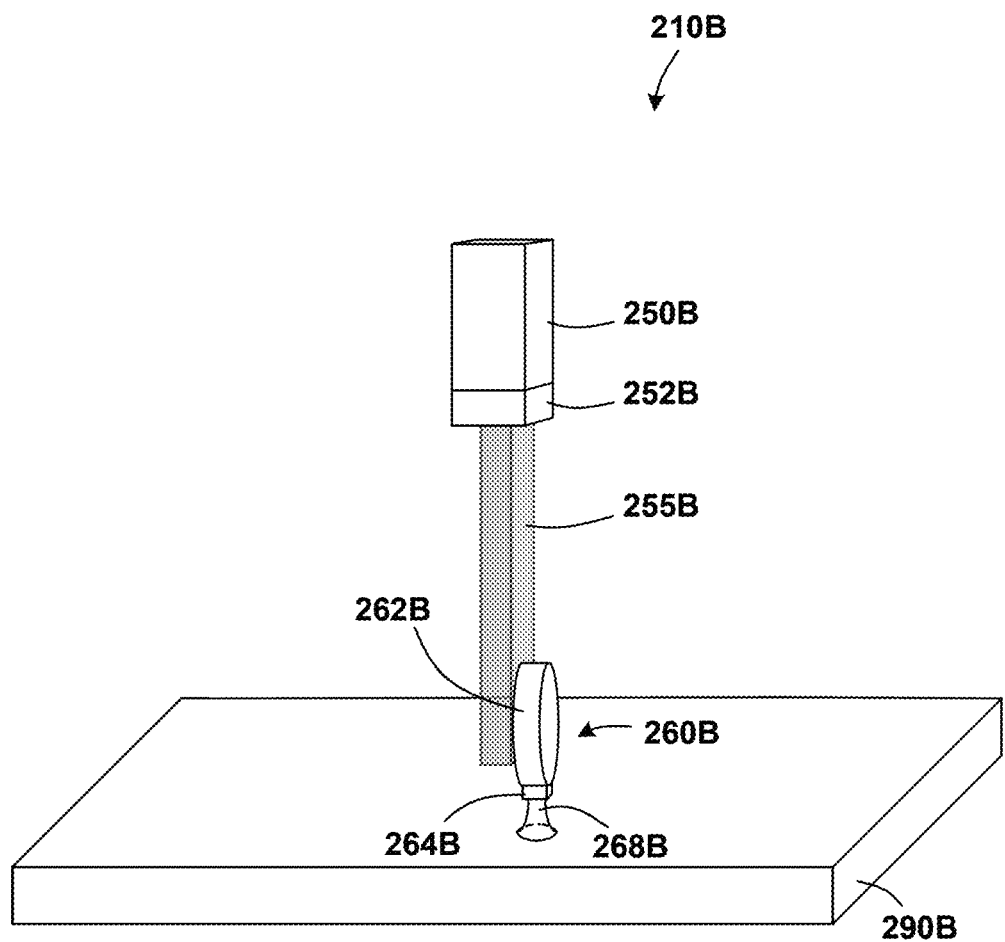
FIG. 2B is a schematic representation of certain components of an optical magnetic recording head in accordance with aspects of the present disclosure.

FIG. 2B schematically shows certain components that may be included in an OMR recording head 210B, in accordance with aspects of the present disclosure. As shown, OMR recording head 210B includes none of the components for producing and directing a magnetic field that were included in FIG. 2A. Instead, a pulsed laser 250B and light modulator 252B are used to produce modulated polarized light pulses that are delivered by a light delivery system 255B to an NFT 260B at or near a media facing surface of the recording head 210B. NFT 260B includes a plasmonic disk 262B and a peg 264B that amplify and direct polarized electromagnetic recording pulses 268B at the magnetic recording media 290B. The electromagnetic recording pulses 268B are polarized so that the magnetic field coupled into the magnetic media 290B can record magnetic bits in a deterministic fashion.

The NFT 260B is configured to preserve the polarization of the modulated light pulses. For circular polarization, the NFT 260B converts circularly polarized light (received via the waveguide) to circularly polarized recording pulses 268B focused to a very narrow spot. This can be achieved by channeling the laser light into a hole surrounded by plasmonic material. The hole focuses the light to a small spot while the plasmonic material enables a circular current to circulate, allowing the circular polarization to persist as the light passes to the media. For linear polarization, the peg 264B generates an electric field that is oriented to point into and out of the media surface as the laser light pulses oscillate. While the term "linear polarization" is used throughout the present disclosure, the polarization can be visualized as "longitudinal polarization" since the electric field of the recording pulses 268B points in the same direction as the direction of light propagation. The NFT 260B design for linear polarization may be the same or very similar to the NFT design used in current HAMR HDDs.

For comparison, in HAMR hard drives the bits are recorded in hundreds to picoseconds, whereas in OMR bits can be recorded in under ten picoseconds. Recording bits in HAMR requires more time to allow the thermal spot created by the NFT and the magnetic field from the magnetic writer to overlap sufficiently to switch the bit. Recording bits in OMR relies on the optical energy produced when the output of an ultrafast pulsed laser interacts with the NFT.

Figure 3:
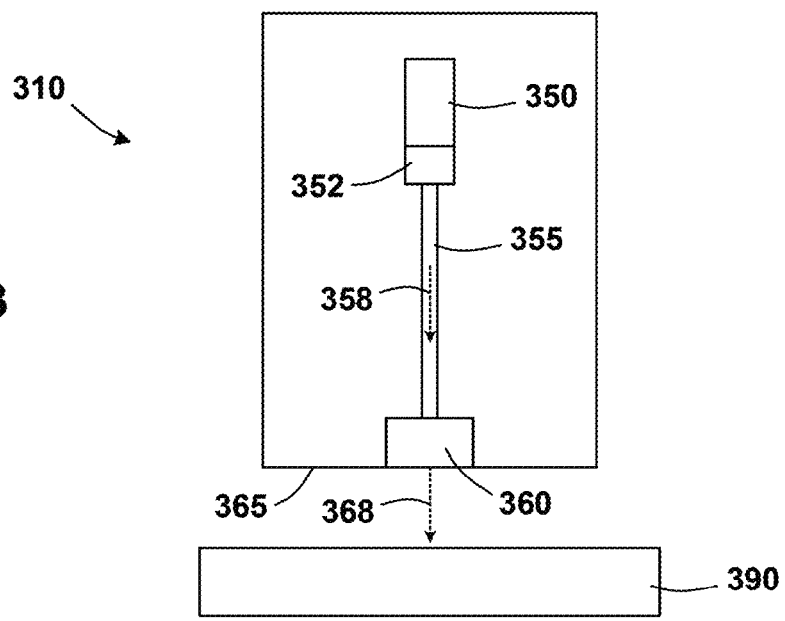
FIG. 3 is a schematic representation of certain components of an optical magnetic recording system in accordance with aspects of the present disclosure.

FIG. 3 schematically shows certain components that may be included in an OMR recording head 310 for optical magnetic recording of data on magnetic media 390, in accordance with aspects of the present disclosure. As shown, OMR recording head 310 includes a pulsed laser 350, a light modulator 352, a waveguide 355 that delivers modulated light pulses 358 from laser 350 to an NFT 360 at or near the ABS 365 of recording head 310. Recording head 310 thereby produces electromagnetic recording pulses that are directed at magnetic media 390 to deterministically write data bits. In operation, data to be recorded is provided to the laser 350 or to the modulator 352, for example at rates of around 2 to 4 Gb per second. The laser 350 may produce light pulses at a rate of 1 to 100 GHz with pulse durations (widths) in a range of 1 to 10,000 femtoseconds. Thus, the recording pulses directed at the media 390 may be in a similar range.

The pulsed laser 350 may be a mode-locked laser capable of generating pulses having picosecond or femtosecond durations. When a laser is mode-locked, one or more (and sometimes several) pulses are circulating in the laser resonator. The case of a single pulse is most common. Each time a pulse hits the output coupler mirror of the laser, a part of its energy is emitted, and as such the laser produces a regular pulse train output. The gain medium of the laser replenishes the pulse energy in each roundtrip. The pulse repetition rate is determined by the resonator round-trip time and the number of pulses. For example, a 10 nanosecond round-trip time for a single pulse leads to a pulse repetition rate of 100 MHz. While typical pulse rates may be between 50 MHz and 500 MHz, miniature lasers can reach repetition rates on the order of 100 GHz. For integration into the footprint of a typically-sized recording head, the laser should fit into an area of about 770 microns by 330 microns, and to accommodate other components and to give the light pulses a sufficient path for direction to the ABS, it may be preferred that the laser dimensions are no bigger than about 400 micron by 100 microns. The laser may be based on GaAs, InP, GaN, InGaN, InGaAs, InGaAsP, or other III-V semiconductor lasers. Transfer printing techniques may be used when integrating such lasers with a recording head.

In an actively mode-locked laser, mode locking can be achieved with a modulator (for example, an electro-optic type modulator) that modulates the resonator losses in synchronism with the resonator round-trips. The modulator may be positioned near an end of the resonator. The pulse duration of actively mode-locked solid-state lasers is typically a few tens of picoseconds. As such, the pulse bandwidth is far smaller than the gain bandwidth of the laser medium. In a passively mode-locked laser, the loss modulation is accomplished by a saturable absorber in the laser rather than an active modulator. This can allow generation of pulses that are shorter than with active mode locking. Passive mode locking can also provide a simpler laser setup since synchronism of the loss modulation is automatically achieved, and an electronic driver is not required.

Modulator 352 may be part of the mode-locked laser 350 or may be a separate device positioned in the light path of light emitted by laser 350. Modulator 352 functions to modulate the power of the optical pulses, thereby using high and low power optical pulses to control the writing of data bits (1s and 0s) to the media disk. The modulator 352 may be an electro-absorption modulator (EAM). Electro-absorption modulators are amplitude modulators that operate at the band edge and use its bias-voltage dependence to modulate absorption. EAMs may require a pin-doped waveguide stack with a different epitaxial structure. The modulator 352 may be an electro-refractive modulator (ERM). An ERM is a pin-doped waveguide section in which a reverse or a forward bias voltage induces a phase shift in light passing through the waveguide. The physical effects under reverse biased operation are very fast. With proper electrode design modulation as fast as 40 Gb per second is possible. The modulator 352 may be based on GaAs, InP, GaN. InGaN, InGaAs, InGaAsP, or the like.

The waveguide 355 and NFT 360 may be the same or similar to those used in current HAMR HDD designs. Preferably, the waveguide has dimensions sufficient to allow transport of the laser light at the chosen wavelength. Waveguide dimension may be highly dependent on the laser wavelength and waveguide refractive index. Waveguide materials may be selected to enable sufficient confinement of light within the allowed space of the recording head. A material with high refractive index is desired. For example, niobium oxide has refractive index 2.29 at a wavelength of 830 nm. The NFT design for circular polarization OMR systems may require a spacing between elements of the same order of magnitude as the desired track width in order to focus light at sufficiently small spot sizes while maintaining polarization. Preferably, circular polarization NFTs are composed of very low loss plasmonic materials such as gold or silver to sufficiently reduce losses and thereby maintain circular polarization of the recording pulses at the required intensity in the media for recording. The NFT design for linear (longitudinal) polarization OMR systems may require a peg size of the same order of magnitude as the track width to focus light to a sufficiently small spot size while maintaining longitudinal polarization. Preferably, linear polarization NFTs are composed of very low or medium loss plasmonic materials such as gold, silver, rhodium, iridium or platinum to sufficiently reduce losses and thereby maintain the linear (longitudinal) polarization at the required intensity in the media for recording.

The magnetic media 390 includes a recording layer for recording data bits as magnetic dipoles. The recording layer may be the same or similar to what is used in current HAMR HDDs, for example a FePt layer. The overall construction of magnetic media 390 may depend on whether the recording pulses 368 are polarized linearly or circularly. Circularly polarized recording pulses can directly deterministically switch bits in an FePt recording layer. Linearly polarized recording pulses may require a multilayer media construction to enable deterministic switching of bits in an FePt recording layer, as described in more detail in reference to FIGS. 6A and 6B and FIGS. 7A and 7B.

Figure 4A:
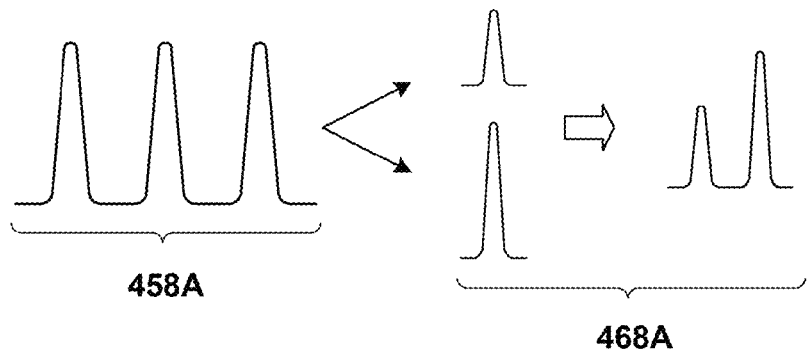
FIGS. 4A and 4B are schematic representations of modulating laser pulses in accordance with certain aspects of the present disclosure.
Figure 4B:
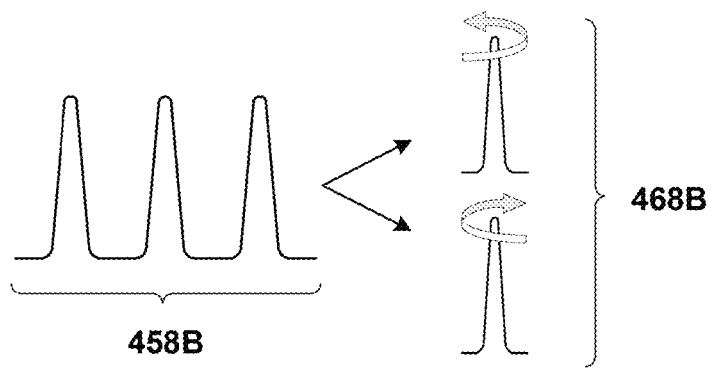

FIGS. 4A and 4B schematically demonstrate options for the modulation of light pulses for use as recording pulses in OMR. FIG. 4A shows a modulation scheme that may be useful when using linearly polarized light pulses 458A. The amplitude of such pulses may be modulated to form high and low recording pulses 468A, which may be ordered in succession as indicated in FIG. 4A to facilitate deterministic switching. For example, as discussed in reference to FIGS. 6A and 6B, in certain multilayer media constructions, a high amplitude pulse will deterministically record an "up" bit, whereas a lower amplitude pulse will function to flip the bit state (up to down, or down to up). Thus, a high pulse followed immediately by a low pulse will deterministically record a down bit. Other media constructions and deterministic recording pulse schemes are also possible.

FIG. 4B shows a modulation scheme that may be useful when using circularly polarized light pulses 458B. The handedness of the circular polarization of such pulses may be modulated to form clockwise and counterclockwise recording pulses 468B. Due to the nature of the electric field of circularly polarized light, the magnetic field of such recording pulses is such that an FePt recording layer (or other suitable magnetic recording layer) may directly deterministically record bits in the recording layer without assistance from other layers in a multilayer construction.

Figure 5:
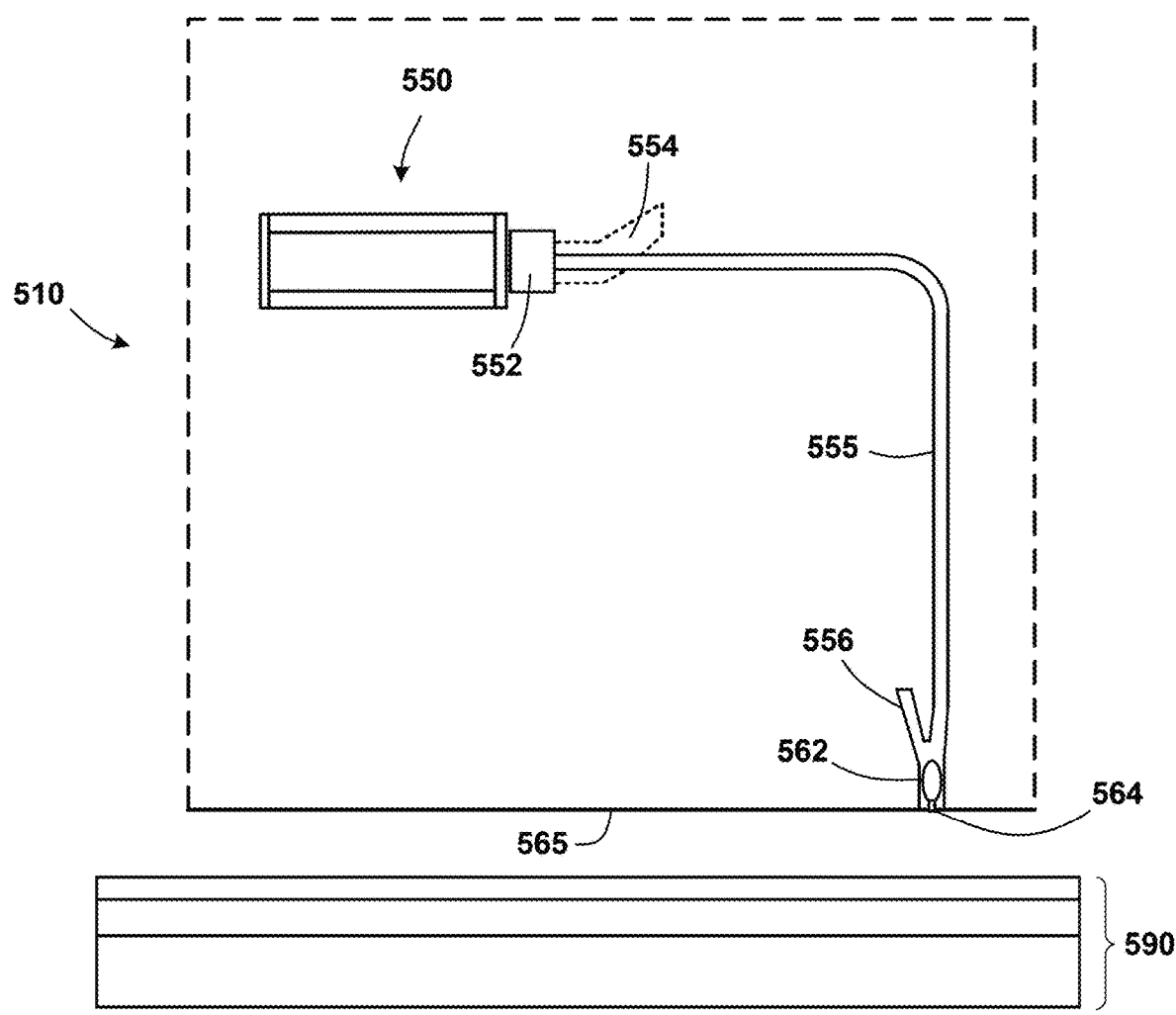
FIG. 5 is a schematic representation of certain components of an optical magnetic recording system in accordance with aspects of the present disclosure.

FIG. 5 schematically shows components of an OMR system that includes an OMR writer 510 and magnetic storage media 590. OMR writer 510 produces linearly polarized recording pulses, and so magnetic storage media 590 is adapted to include layers that support the deterministic recording of data bits directly by the linearly polarized recording pulses. Data to be written to the magnetic storage media 590 is sent to a modulator that modulates the light pulses produced by laser 550. For example, the modulator may modulate the pulses so that high power pulses are produced for switching magnetic bits to the 0 data state and lower power pulses are produced for switching magnetic bits to the 1 data state. The modulator may be internal to the laser 550 or may be provided externally to the laser 550 as indicated by modulator 552. Preferably, laser 550 is a laser capable of producing ultrafast pulses and of being operated in an active or passive mode-locked fashion. Optionally, a coupler 554 may be provided to couple the light pulses from the laser 550 or from the modulator 552 into waveguide 555.

Waveguide 555 delivers the light pulses to an NFT having a plasmonic disk 562 and a peg 564 positioned at or near the media-facing surface 565 of the writer 510. Waveguide 555 may optionally include a mode converter 556 near where the light pulses are delivered to the NFT. Other features not shown may optionally be included such as laser power monitors and so forth. The couplers, waveguides, mode converters, and NFT components may be of the same or similar construction, configuration, and material found in current HAMR HDDs.

Figure 6A:
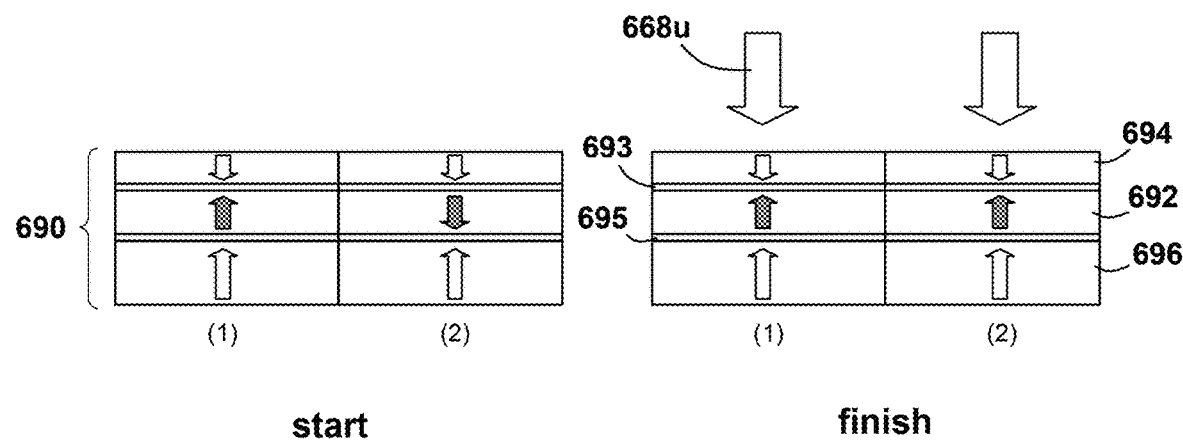
FIGS. 6A and 6B are schematic representations of bit flipping in a multilayer optical magnetic recording medium using linearly polarized electromagnetic pulses in accordance with aspects of the present disclosure.
Figure 6B:
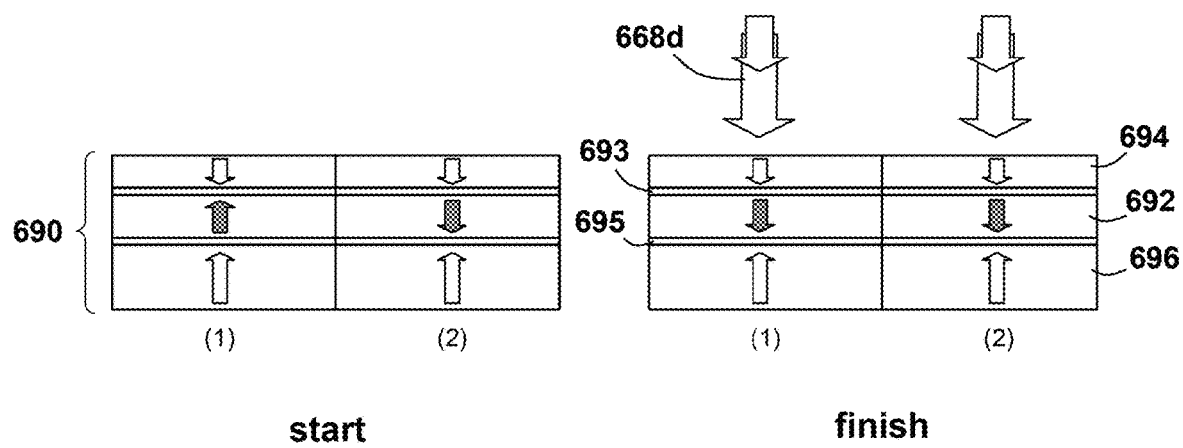

For deterministic switching (or flipping) of bits in OMR systems using linearly polarized recording pulses, multilayer magnetic recording media may be used. For example, FIGS. 6A and 6B schematically demonstrated the deterministic switching of bits in a magnetic recording medium 690 that includes five layers involved in the recording process. A data recording layer 692 is disposed between a top spin torque transfer layer (or STT layer) 694 and a bottom STT layer 696, with a top spacer layer 693 between the recording layer 692 and the top STT layer 694 and a bottom spacer layer 695 between the recording layer 692 and the bottom STT layer 696. The recoding layer 692 may be an FePt recording layer or may be composed of other suitable materials.

The STT layers function to emit a spin transfer current to the recording layer when illuminated by a linearly polarized light pulse, thus allow for deterministic switching. The STT layers may be composed of a high anisotropy material that holds its perpendicular magnetic configuration during the recording process. Such a layer will generate the required spin current to switch the recording layer under high power conditions. The material can be any ferromagnetic, ferrimagnetic or antiferromagnetic material that satisfies the above conditions. The spacer layers function to separate the STT layers from the recording layer, and are preferably thin layers composed of a material capable of conducting spin current, such as copper or silver.

When the five-layer media 690 shown in FIGS. 6A and 6B is illuminated by a light pulse, both the top and bottom STT layers emit spin polarized current to the recording layer. Each STT layer will emit spin polarized current having a spin polarization in the same orientation as the magnetization direction of the layer. When the spin polarized current is high enough, the magnetic orientation in the recording layer will switch. The final magnetization direction in the recording layer will depend on the net strength of the combined spin polarized currents from both STT layers. As shown in FIG. 6A, a single high power laser pulse will deterministically produce a recording layer magnetization that finishes in the up state. As shown in FIG. 6B, a high power pulse immediately followed by a low power pulse will deterministically produce a recording layer magnetization that finishes in the down state.

FIG. 6A shows the start state and finish state of two side-by-side bits, bits (1) and (2), in magnetic medium 690 subjected to a single high power recording pulse 668u. The open arrows indicate the orientations of the top STT layer 694 and bottom STT layer 696, and the shaded arrows indicate the magnetic state of the data bit in the recording layer 692. At the start, before being exposed to a recording pulse, data bit (1) is in an up state (shaded arrow is up in the recording layer 692), and data bit (2) is in a down state. A high power recording pulse 668u is applied to the media 690 in the area of each data bit. The high power pulse 668u produces a combined spin polarized current that is sufficient to induce the magnetization in the recording layer 692 to finish in the up state. For data bit (1), the magnetization in the recording layer 692 was already in the up state, so it remains in the up state. For data bit (2), the magnetization in the recording layer 692 started in the down state, so it is flipped to the up state.

FIG. 6B also shows the start state and finish state bits (1) and (2) in magnetic medium 690, this time subjected to a set of down switching pulses 668d. As with FIG. 6A, the open arrows indicate the orientations of the top STT layer 694 and bottom STT layer 696, and the shaded arrows indicate the magnetic state of the data bit in the recording layer 692. At the start, before being exposed to recording pulses, data bit (1) is in an up state and data bit (2) is in a down state. A recording pulse 668d is applied to the media 690. Recording pulse 668d is actually two pulses, a high power recording pulse immediately following by a low power recording pulse. A low power recording pulse produces a combined spin polarized current that flips the magnetization in the recording layer 692 no matter what the starting point. As such, using a high power pulse immediately prior to a low power pulse will force the magnetization in the recording layer 692 into the up state and then flip that to the down state. In FIG. 6B, since data bit (1) was initially in the up state, the high power pulse keeps data bit (1) in the up state and the low power pulse flips data bit (1) to the down state, which is its finish state. For data bit (2), the magnetization in the recording layer 692 started in the down state, so the high power pulse flips that to the up state and then the low power pulse flips it back to the down state, which is its finish state.

Figure 7A:
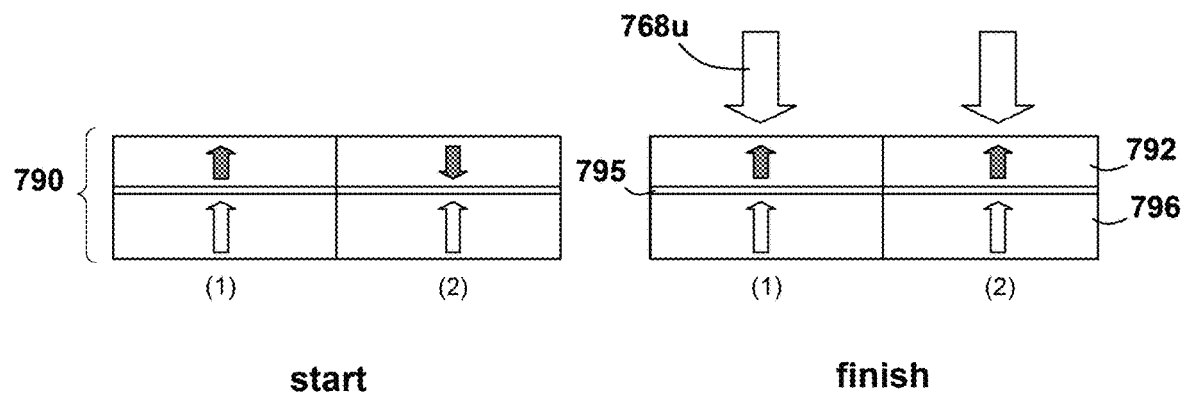
FIGS. 7A and 7B are schematic representations of bit flipping in another multilayer optical magnetic recording medium using linearly polarized electromagnetic pulses in accordance with aspects of the present disclosure.
Figure 7B:
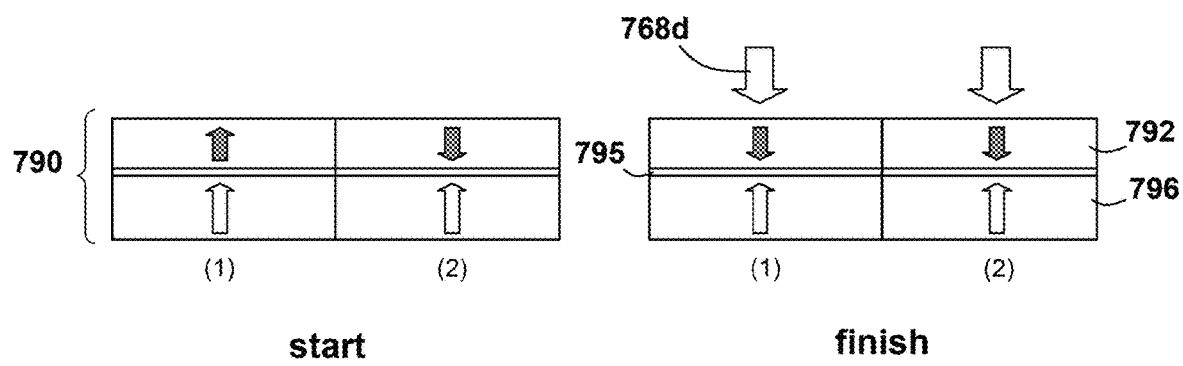

FIGS. 7A and 7B schematically depict deterministic bit switching using linearly polarized recording pulses to illuminate a three layer magnetic media construction 790. A data recording layer 792 is disposed on an STT layer 796 with a spacer layer 795 disposed between them. The recoding layer 792 may be an FePt recording layer or may be composed of other suitable materials. The STT layer emits a spin transfer current to the recording layer 792 when illuminated by a linearly polarized recording pulse, thus allow for deterministic switching. The STT layer 796 may be composed of a high anisotropy material that holds its perpendicular magnetic configuration during the recording process. The layer will generate the required spin current to switch the recording layer under high power conditions. The material can be any ferromagnetic (such as FePt, SmCo, or CoPt), ferrimagnetic or antiferromagnetic (such as PtMn or IrMn) material that satisfies the above conditions. The spacer layer 796 separates the STT layer 796 from the recording layer 792, and is preferably a thin layer composed of a material capable of conducting spin current, such as copper or silver.

During operation using a three layer magnetic recording media such as shown in FIGS. 7A and 7B, a lower laser power results in spin current emission only from the recording layer, whereas higher laser power results in emission from both the recording layer and the STT layer. Minority spin current from the recording layer 792 dominates with low power recording pulses, while majority spin current from the STT 796 dominates with high power recording pulses. A single high intensity recording pulse 768u produces magnetization in the recording layer 792 that always finishes in the up state. A single low intensity recording pulse 768d produces magnetization in the recording layer 792 that always finishes in the down state.

FIG. 7A shows the start state and finish state of two side-by-side bits, bits (1) and (2), in three layer magnetic medium 790 subjected to a high intensity recording pulse 768u. The open arrows indicate the orientations of the STT layer 796 and the shaded arrows indicate the magnetic state of the data bit in the recording layer 792. At the start, before being exposed to a recording pulse, data bit (1) is in an up state and data bit (2) is in a down state. A high power recording pulse 768u is applied to the media 790 in the area of each data bit. The high power pulse 768u produces a combined spin polarized current that is sufficient to induce the magnetization in the recording layer 792 to finish in the up state. For data bit (1), the magnetization in the recording layer 792 was already in the up state, so it remains in the up state. For data bit (2), the magnetization in the recording layer 792 started in the down state, so it is flipped to the up state.

FIG. 7B shows the start state and finish state bits (1) and (2) in magnetic medium 790 subjected to a low intensity recording pulses 768d. As with FIG. 7A, the open arrows indicate the orientations of the STT layer 796 and the shaded arrows indicate the magnetic state of the data bit in the recording layer 792. At the start, before being exposed to recording pulses, data bit (1) is in an up state and data bit (2) is in a down state. A low power recording pulse 768u is applied to the media 790 in the area of each data bit. The low power pulse 768u produces a combined spin polarized current that is sufficient to induce the magnetization in the recording layer 792 to finish in the down state. For data bit (1), the magnetization in the recording layer 792 was in the up state, so it finishes in the down state. For data bit (2), the magnetization in the recording layer 792 was already in the down state, so it remains in the down state.

Figure 8:
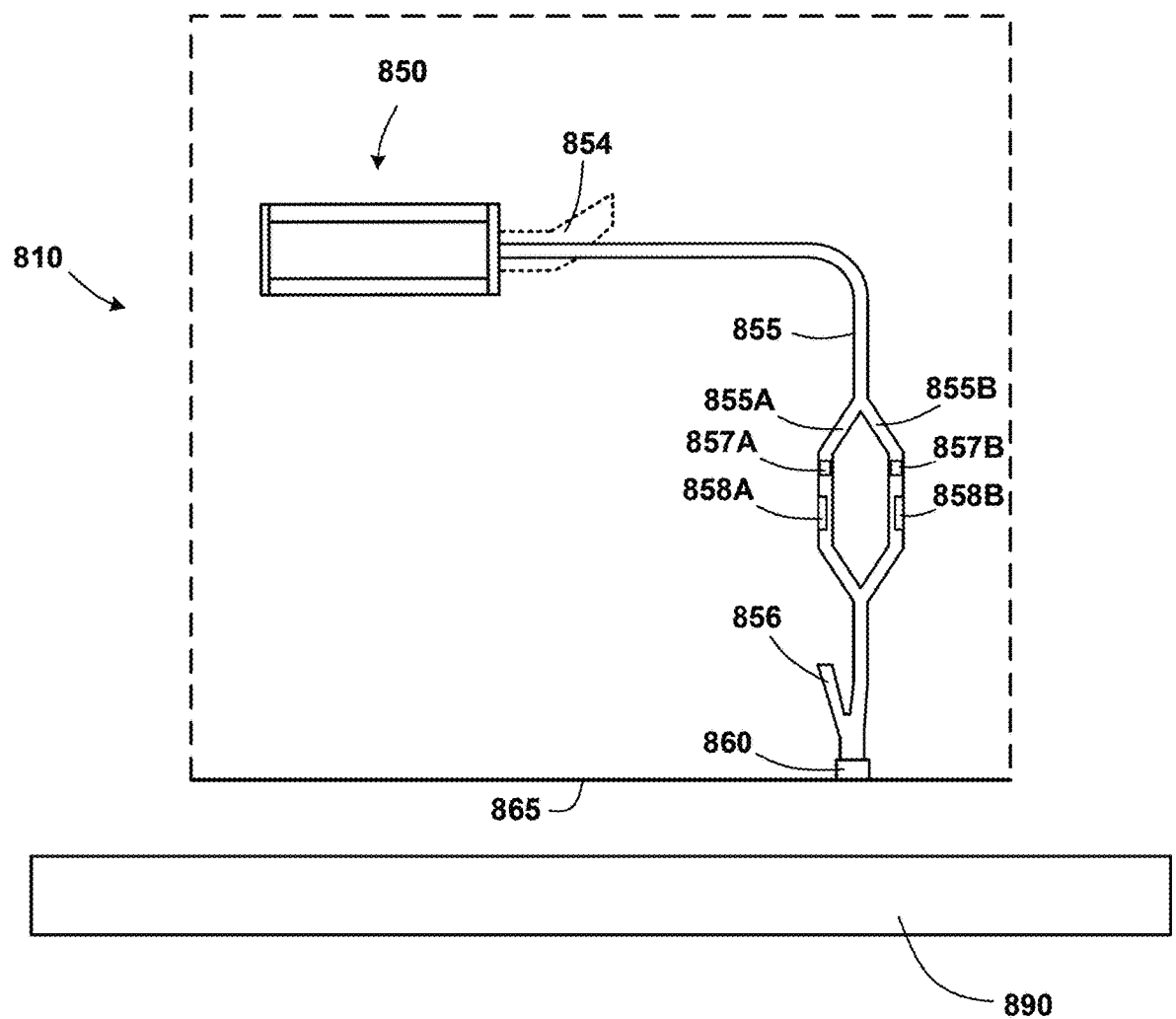
FIG. 8 is a schematic representation of certain components of an optical magnetic recording system in accordance with aspects of the present disclosure.

FIG. 8 schematically shows components of an OMR system that includes an OMR writer 810 and magnetic storage media 890. OMR writer 810 produces circularly polarized recording pulses, and so magnetic storage media 890 is adapted support the deterministic recording of data bits directly by the circularly polarized recording pulses. OMR writer 810 includes a laser 850 that is preferably capable of producing ultrafast pulses and of being operated in an active mode-locked fashion. Laser 850 includes a modulator (not shown) for producing modulated pulses according to the data states to be written to the magnetic media 890. Optionally, a coupler 854 may be provided to couple the light pulses from the laser 850 into waveguide 855. Waveguide 855 delivers the light pulses to a branch point between a first modulated waveguide branch 855A for producing clockwise (CW) circularly polarized light and a second modulated waveguide branch 855B for producing counterclockwise (CCW) circularly polarized light. Each waveguide branch 855A and 855B includes a modulator 857A and 857B that in effect selects or deselects the use of the respective branch, and a mode converter 858A and 858B that converts the light to the appropriate circularly polarized state, CW for mode converter 858A and CCW for mode converter 858B. The modulated pulses are then delivered to NFT 860 at or near the air-bearing surface 865 for focusing and directing recording pulses to the magnetic media 890. Optionally, a mode converter 856 may be disposed in the waveguide 855 near the NFT 860.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. An optical magnetic recording system comprising a recording head that includes an optical writer configured to generate light pulses for deterministically recording data bits on a magnetic storage medium located proximate to a media-facing surface of the recording head without the aid of an additionally applied magnetic field, the optical writer comprising:
    a pulsed laser;
    a modulator configured to modulate light pulses produced by the pulsed laser in correspondence to data bits to be recorded on the magnetic storage medium;
    a near field transmitter located at or near a media-facing surface; and
    a light guide configured to deliver the light pulses modulated by the modulator to the near field transmitter for focusing and directing recording pulses to the magnetic storage medium.

2. The optical magnetic recording system of claim 1, wherein the recording pulses are linearly polarized.

3. The optical magnetic recording system of claim 1, wherein the recording pulses are circularly polarized.

4. The optical magnetic recording system of claim 1, wherein the pulsed laser is an active or passive mode-locked laser.

5. The optical magnetic recording system of claim 1 configured to record data at data rates in a range of about 2 Gb per second to about 4 Gb per second.

6. The optical magnetic recording system of claim 1, wherein the laser is configured to produce light pulses having widths of about 10 picoseconds or less.

7. The optical magnetic recording system of claim 1, wherein the laser is sized to be integrated within the recording head and to fit into an area of about 770 microns by 330 microns.

8. The optical magnetic recording system of claim 1, wherein the laser is a III-V semiconductor laser.

9. The optical magnetic recording system of claim 1, wherein the modulator comprises an electro-absorption modulator or an electro-refractive modulator.

10. A method for deterministically recording data on a magnetic storage medium using electromagnetic pulses without the aid of an additionally applied magnetic field, the method comprising:
    generating laser light pulses;
    modulating the laser light pulses in accordance with data bits to be recorded on the magnetic storage medium, thereby producing high power recording pulses and low power recording pulses;
    using a single high power recording pulse to record a data bit on the magnetic storage medium in a first data state; and
    using a single high power recording pulse followed immediately by a single low power recording pulse to record a data bit on the magnetic storage medium in a second data state.

11. The method of claim 10, wherein the laser light pulses are linearly polarized.

12. The method of claim 11, wherein modulating the laser light pulses maintains the polarization.

13. The method of claim 10, further comprising using a near field transducer to focus and direct the recording pulses at the magnetic storage medium.

14. The method of claim 10, wherein the magnetic storage medium has a layered construction that comprises a FePt recording layer disposed between a first spin torque transfer layer and a second spin torque transfer layer.

15. The method of claim 14, wherein a first spacer layer is disposed between the first spin torque transfer layer and the FePt recording layer, and a second spacer layer is disposed between the second spin torque transfer layer and the FePt recording layer.

16. An optical writer for an optical magnetic recording system, the optical writer comprising:
    a laser configured to produce linearly polarized light pulses;
    a waveguide configured to receive the linearly polarized light pulses from the laser; and
    a circular polarization switch coupled to the waveguide, the circular polarization switch including a first branch having a first modulator configured to select and deselect use of the first branch and a first mode converter for converting linearly polarized light to clockwise circularly polarized light, and a second branch having a second modulator configured to select and deselect use of the second branch and a second mode converter for converting linearly polarized light to counterclockwise circularly polarized light,
    wherein the circular polarization switch is configured to convert the linearly polarized light pulses to clockwise or counterclockwise circularly polarized light pulses in accordance with data bits to be recorded by the optical magnetic recording system.

17. The optical writer of claim 16, wherein the laser is an active or passive mode-locked laser.

18. The optical writer of claim 16 configured to record data at data rates in a range of about 2 Gb per second to about 4 Gb per second.

19. The optical writer of claim 16, wherein the laser is configured to produce light pulses having widths of about 10 picoseconds or less.

20. The optical writer of claim 16, wherein the laser is sized to fit into an area of about 770 microns by 330 microns.

21. The optical writer of claim 16, wherein the laser is a III-V semiconductor laser.

22. The optical writer of claim 16, further comprising a near field transmitter positioned to receive light converted by the circular polarization switch and configured to produce recording pulses that preserve the polarization state of the light received by the circular polarization switch.

23. A layered magnetic storage medium for use with a magnetic optical recording system, comprising:
    a FePt recording layer for storing data bits in up and down magnetization states;
    a first spin torque transfer layer disposed above the FePt recording layer and configured to emit a first spin transfer current to the FePt recording layer when illuminated by a linearly polarized light pulse;
    a first spacer layer capable of conducting spin current and disposed between the FePt recording layer and the first spin torque transfer layer;
    a second spin torque transfer layer disposed below the FePt recording layer and configured to emit a second spin transfer current to the FePt recording layer when illuminated by a linearly polarized light pulse; and
    a second spacer layer capable of conducting spin current and disposed between the FePt recording layer and the second spin torque transfer layer,
    wherein the second spin transfer current is greater than the first spin transfer current.

24. The layered magnetic storage medium of claim 23, wherein the first spin torque transfer layer and the second spin torque transfer layer are high anisotropy materials.

25. The layered magnetic storage medium of claim 24, wherein the first spin torque transfer layer and the second spin torque transfer layer are ferromagnetic, ferrimagnetic or antiferromagnetic materials.

26. The layered magnetic storage medium of claim 24, wherein the first spin torque transfer layer and the second spin torque transfer layer are FePt, SmCo, CoPt, PtMn, or IrMn.

27. The layered magnetic storage medium of claim 23, wherein the first spacer layer and the second spacer layer are composed of materials capable of conducting spin current.

28. The layered magnetic storage medium of claim 23, wherein the first spacer layer and the second spacer layer are copper or silver.

\* \* \* \* \*